(12) United States Patent
LaCroix et al.

(10) Patent No.: US 9,050,735 B2
(45) Date of Patent: Jun. 9, 2015

(54) AUTOMATIC CLIPPING LINE

(75) Inventors: Wolfgang LaCroix, Pfalzgrafenweiler (DE); Daniel J. Ràstatter, Beaver Falls, PA (US); Juergen F. Trost, Canfield, OH (US)

(73) Assignee: Danzer Services Schweiz AG, Baar (CH)

( * ) Notice: Subject to any disclaimer, the term of this patent is extended or adjusted under 35 U.S.C. 154(b) by 1135 days.

(21) Appl. No.: 11/471,250

(22) Filed: Jun. 20, 2006

(65) Prior Publication Data

US 2007/0289673 A1    Dec. 20, 2007

(51) Int. Cl.
| | | |
|---|---|---|
| *B27B 1/00* | (2006.01) |
| *B23Q 15/00* | (2006.01) |
| *B23Q 16/00* | (2006.01) |
| *B26D 1/56* | (2006.01) |
| *B26D 7/06* | (2006.01) |
| *B27B 15/08* | (2006.01) |
| *B27B 5/06* | (2006.01) |
| *B23D 45/04* | (2006.01) |
| *B27B 31/06* | (2006.01) |
| *B27G 1/00* | (2006.01) |
| *B27L 5/08* | (2006.01) |

(52) U.S. Cl.
CPC .............. *B27B 5/06* (2013.01); *B23D 45/042* (2013.01); *B27B 31/06* (2013.01); *B27G 1/00* (2013.01); *B27L 5/08* (2013.01)

(58) Field of Classification Search
USPC .................. 83/39, 298, 339, 373, 404.2, 448, 83/471.3, 498, 504, 508.3, 803, 804, 807, 83/808; 144/376, 378, 367, 2.1, 3.1, 144/356–357
See application file for complete search history.

(56) References Cited

U.S. PATENT DOCUMENTS

| | | | | |
|---|---|---|---|---|
| 176,892 A | * | 5/1876 | Rollins ........................... 83/877 |
| 386,035 A | * | 7/1888 | Riegel .......................... 83/404.1 |
| 619,541 A | * | 2/1899 | Butterfield ................... 83/409.1 |
| 1,601,610 A | * | 9/1926 | Carter .......................... 83/471.3 |
| 1,795,953 A | * | 3/1931 | Johnson ......................... 144/1.1 |
| 1,959,667 A | * | 5/1934 | Grant .............................. 83/368 |
| 2,332,654 A | * | 10/1943 | Mead et al. ..................... 83/359 |
| 2,501,299 A | * | 3/1950 | Anderson ................... 83/425.4 |
| 3,165,961 A | | 1/1965 | Hammond |
| 3,318,347 A | * | 5/1967 | Alich ............................... 83/74 |
| 3,380,494 A | * | 4/1968 | Mayo ........................... 83/404.1 |
| 3,545,504 A | * | 12/1970 | Ferrari ............................ 83/422 |

(Continued)

FOREIGN PATENT DOCUMENTS

EP        0 500 161 A2    8/1992

OTHER PUBLICATIONS

International Search Report and Written Opinion of the International Searching Authority completed Sep. 22, 2008 for PCT/US2007/001791.

(Continued)

*Primary Examiner* — Ghassem Alie
*Assistant Examiner* — Bharat C Patel
(74) *Attorney, Agent, or Firm* — Barnes & Thornburg LLP (57) ABSTRACT

A method and apparatus for trimming the edges of sheets including providing a conveyor, a first saw and a second saw, first conveying the sheets on the conveyor past the first saw, trimming a first side edge of the sheets, and then conveying the sheets on the conveyor past the second saw and trimming a second side edge of the sheets.

11 Claims, 10 Drawing Sheets

(56) References Cited

U.S. PATENT DOCUMENTS

| | | | | |
|---|---|---|---|---|
| 3,710,836 | A * | 1/1973 | Busch | 147/28 |
| 3,760,667 | A | 9/1973 | Maxey et al. | |
| 4,098,310 | A * | 7/1978 | Sanford et al. | 144/402 |
| 4,196,648 | A * | 4/1980 | Jones et al. | 83/365 |
| 4,208,934 | A * | 6/1980 | Wall | 83/468 |
| 4,239,069 | A * | 12/1980 | Zimmerman | 144/39 |
| 4,277,998 | A * | 7/1981 | Mayo | 83/404.1 |
| 4,409,875 | A * | 10/1983 | Nakajima et al. | 83/877 |
| 4,596,172 | A | 6/1986 | Visser | |
| 4,599,929 | A * | 7/1986 | Dutina | 83/821 |
| 4,606,387 | A * | 8/1986 | Weislogel et al. | 144/356 |
| 4,682,639 | A * | 7/1987 | Takeda et al. | 144/242.1 |
| 4,712,596 | A * | 12/1987 | McClaran | 144/3.1 |
| 4,770,076 | A * | 9/1988 | Wilson | 83/75.5 |
| 4,823,664 | A * | 4/1989 | Cooper et al. | 83/367 |
| 4,930,387 | A * | 6/1990 | Miettinen | 83/508.3 |
| 4,931,113 | A | 6/1990 | Feichtmeir et al. | |
| 4,954,202 | A * | 9/1990 | Price et al. | 156/353 |
| 5,176,060 | A * | 1/1993 | Thornton | 83/471.2 |
| 5,302,228 | A * | 4/1994 | Holland | 156/510 |
| 5,785,102 | A * | 7/1998 | Hamel | 144/387 |
| 5,943,239 | A * | 8/1999 | Shamblin et al. | 700/160 |
| 6,021,701 | A * | 2/2000 | McKeegan et al. | 83/471.3 |
| 6,062,280 | A * | 5/2000 | Newnes et al. | 144/357 |
| 6,116,126 | A * | 9/2000 | Van Den Bulcke et al. | 83/13 |
| 6,212,983 | B1 * | 4/2001 | Pyle | 83/34 |
| 6,526,856 | B2 * | 3/2003 | Newnes | 83/423 |
| 6,615,100 | B1 * | 9/2003 | Urmson | 700/167 |
| 6,688,197 | B1 * | 2/2004 | Niemela | 83/39 |
| 6,817,392 | B2 * | 11/2004 | Phillips | 144/39 |
| 7,258,050 | B2 * | 8/2007 | Griffith | 83/49 |
| 7,331,267 | B2 * | 2/2008 | Urmson | 83/651 |
| 2001/0045150 | A1 | 11/2001 | Owens | |
| 2003/0192412 | A1 | 10/2003 | Otto et al. | |
| 2005/0034786 | A1 * | 2/2005 | Dargan | 144/367 |

OTHER PUBLICATIONS

European search report from EP 12163938.9 dated Apr. 26, 2012, 7 pages.

Office Action from EP 12163938.9 dated Sep. 29, 2014, 6 pages.

* cited by examiner

AUTOMATIC CLIPPING LINE

FIELD OF THE INVENTION

This invention relates to processing machinery. It is disclosed in the context of methods and apparatus for trimming sheets of wood veneer. However, it is believed to be useful in other applications as well.

BACKGROUND OF THE INVENTION

In the past, sheets of wood veneer have been trimmed using package cutters. In such veneer trimmers, stacked sheets of wood veneer (hereinafter sometimes referred to as books of veneer) are trimmed. In addition, the books may be split, for example; by parallel connected circular saws positioned in a row transverse to the direction of the cuts.

DISCLOSURE OF THE INVENTION

According to an aspect of the invention, apparatus for trimming the edges of sheets includes a conveyor for conveying the sheets past a first saw for trimming a first side edge of the sheets, and then past a second saw for trimming a second side edge of the sheets.

Illustratively according to this aspect of the invention, at least one of the first and second saws is adjustable to cut at a non-zero angle to a longitudinal extent of the conveyor.

Further illustratively according to this aspect of the invention, the apparatus includes at least a third saw. The conveyor conveys the sheets past the third saw for splitting the sheets between the first and second side edges.

Illustratively according to this aspect of the invention, the at least third saw comprises third and fourth saws. The conveyor conveys the sheets past the third and fourth saws for removing a portion of the sheets between the first and second side edges.

Illustratively according to this aspect of the invention, the saws include motors for adjusting the positions of the saws generally transversely of the conveyor.

Further illustratively according to this aspect of the invention, the apparatus includes a control system for automatically positioning the saws.

Further illustratively according to this aspect of the invention, the apparatus includes a control system for automatically positioning the saws generally transversely of the conveyor.

Illustratively according to this aspect of the invention, the conveyor comprises a conveyor for conveying stacked sheets.

Illustratively according to this aspect of the invention, the conveyor comprises a conveyor for holding the sheets together in stacks.

Illustratively according to this aspect of the invention, the sheets comprise sheets of wood veneer.

Further illustratively according to this aspect of the invention, the apparatus includes a guide and a waste conveyor for guiding and conveying waste from the saws.

Illustratively according to this aspect of the invention, the saws comprise circular saws.

According to another aspect of the invention, a method of trimming the edges of sheets includes providing a conveyor, a first saw and a second saw, first conveying the sheets on the conveyor past the first saw, trimming a first side edge of the sheets, and then conveying the sheets on the conveyor past the second saw and trimming a second side edge of the sheets.

Further illustratively according to this aspect of the invention, the method includes adjusting at least one of the first and second saws to cut at a non-zero angle to a longitudinal extent of the conveyor.

Further illustratively according to this aspect of the invention, the method includes conveying the sheets past a third saw for splitting the sheets between the first and second side edges.

Illustratively according to this aspect of the invention, conveying the sheets past at least a third saw comprises conveying the sheets past third and fourth saws.

Further illustratively according to this aspect of the invention, the method includes adjusting the positions of the saws generally transversely of the conveyor.

Further illustratively according to this aspect of the invention, the method includes automatically positioning the saws generally transversely of the conveyor.

Illustratively according to this aspect of the invention, trimming sheets assembled into stacks of sheets.

Further illustratively according to this aspect of the invention, the method includes holding the sheets together in stacks.

Illustratively according to this aspect of the invention, trimming the sheets comprises trimming sheets of wood veneer.

Further illustratively according to this aspect of the invention, the method includes guiding and conveying waste from the saws.

Illustratively according to this aspect of the invention, conveying the sheets past a saw comprises conveying the sheets past a circular saw.

According to another aspect of the invention, a scanning device for scanning at least one sheet of wood veneer includes a conveyor, a scanner housing, a radiation source for irradiating the at least one sheet of veneer, and a scanning device for detecting a feature which it is desired to trim from the at least one sheet of veneer.

Illustratively according to this aspect of the invention, the scanning device further includes at least one detector for detecting at least one edge of the at least one sheet of veneer.

Illustratively according to this aspect of the invention, the at least one detector comprises at least one detector for detecting two edges of the at least one sheet of veneer, and a control system for receiving information related to the thus detected edges and determining the width of the at least one sheet of veneer as the at least one sheet of veneer is conveyed through the housing.

Illustratively according to this aspect of the invention, the control system receives information related to the thus detected feature and calculates a trimming solution based upon the information.

Illustratively according to this aspect of the invention, the control system is further adapted to detect marks placed on the sheet of veneer and to calculate a trimming solution based upon the marks instead of upon the information if such marks have been placed on the sheet of veneer.

According to another aspect of the invention, a method of scanning at least one sheet of veneer, the method including conveying the at least one sheet of veneer through a scanner housing, irradiating the at least one sheet of veneer as it passes through the scanner housing, and scanning the irradiated at least one sheet of veneer as it passes through the scanner housing in order to detect a feature which it is desired to trim from the at least one sheet of veneer.

Illustratively according to this aspect of the invention, scanning the irradiated at least one sheet of veneer includes detecting at least one edge of the at least one sheet of veneer.

Illustratively according to this aspect of the invention, detecting at least one edge of the at least one sheet of veneer comprises detecting at least two edges of the at least one sheet of veneer, and receiving information related to the thus detected edges and determining the width of the at least one sheet of veneer, as the at least one sheet of veneer is conveyed through the housing.

Illustratively according to this aspect of the invention, the method includes receiving information related to the thus detected feature and calculating a trimming solution based upon the information.

Further illustratively according to this aspect of the invention, the method includes detecting marks placed on the sheet of veneer and calculating a trimming solution based upon the marks instead of upon the information if such marks have been placed on the sheet of veneer.

BRIEF DESCRIPTION OF THE DRAWINGS

The invention may best be understood by referring to the following detailed description and accompanying drawings which illustrate the invention. In the drawings.

DETAILED DESCRIPTIONS OF ILLUSTRATIVE EMBODIMENTS

Figure 1:
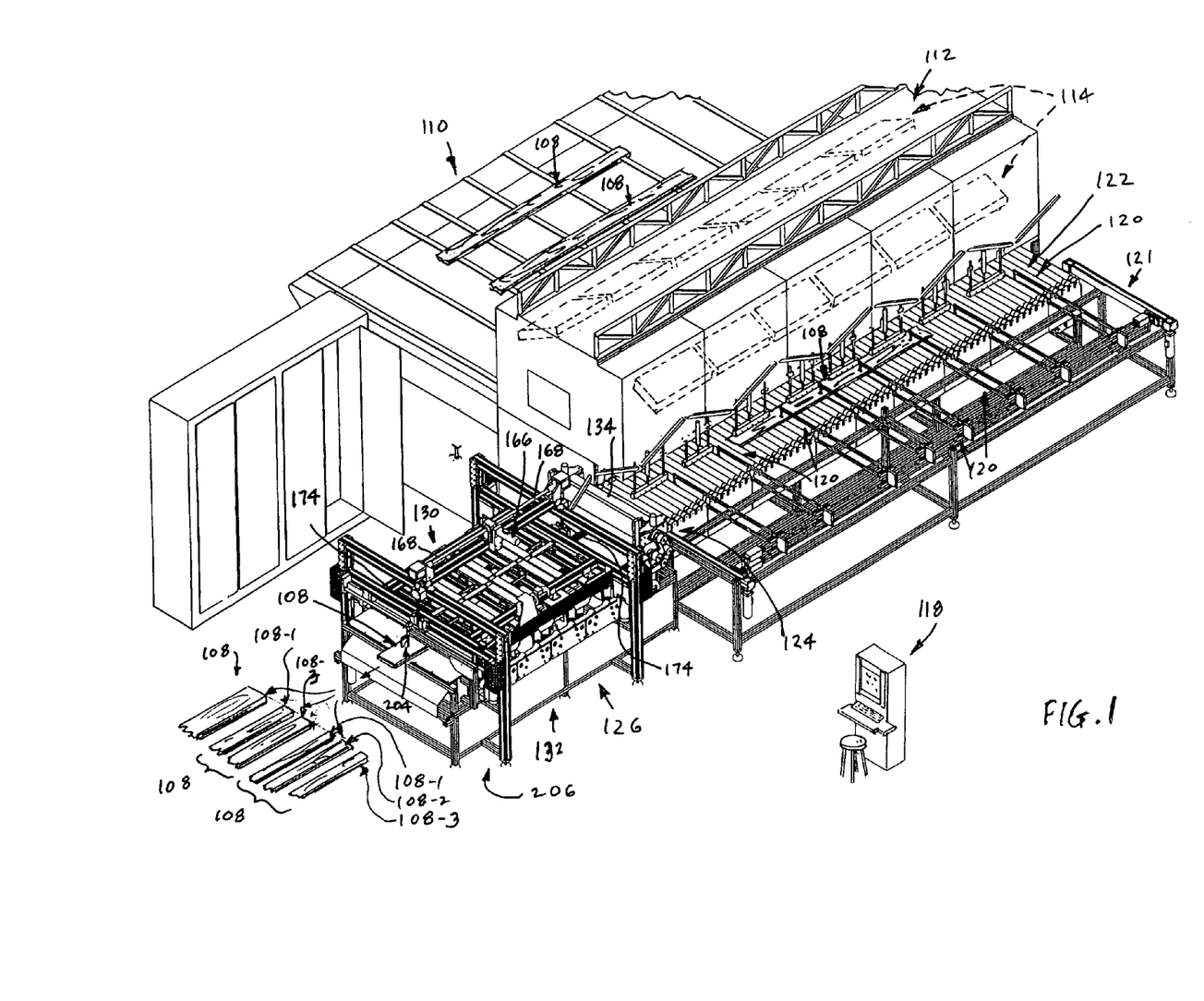
FIG. 1 illustrates a partly fragmentary perspective view of an apparatus for performing a method according to the invention.
Figure 2:
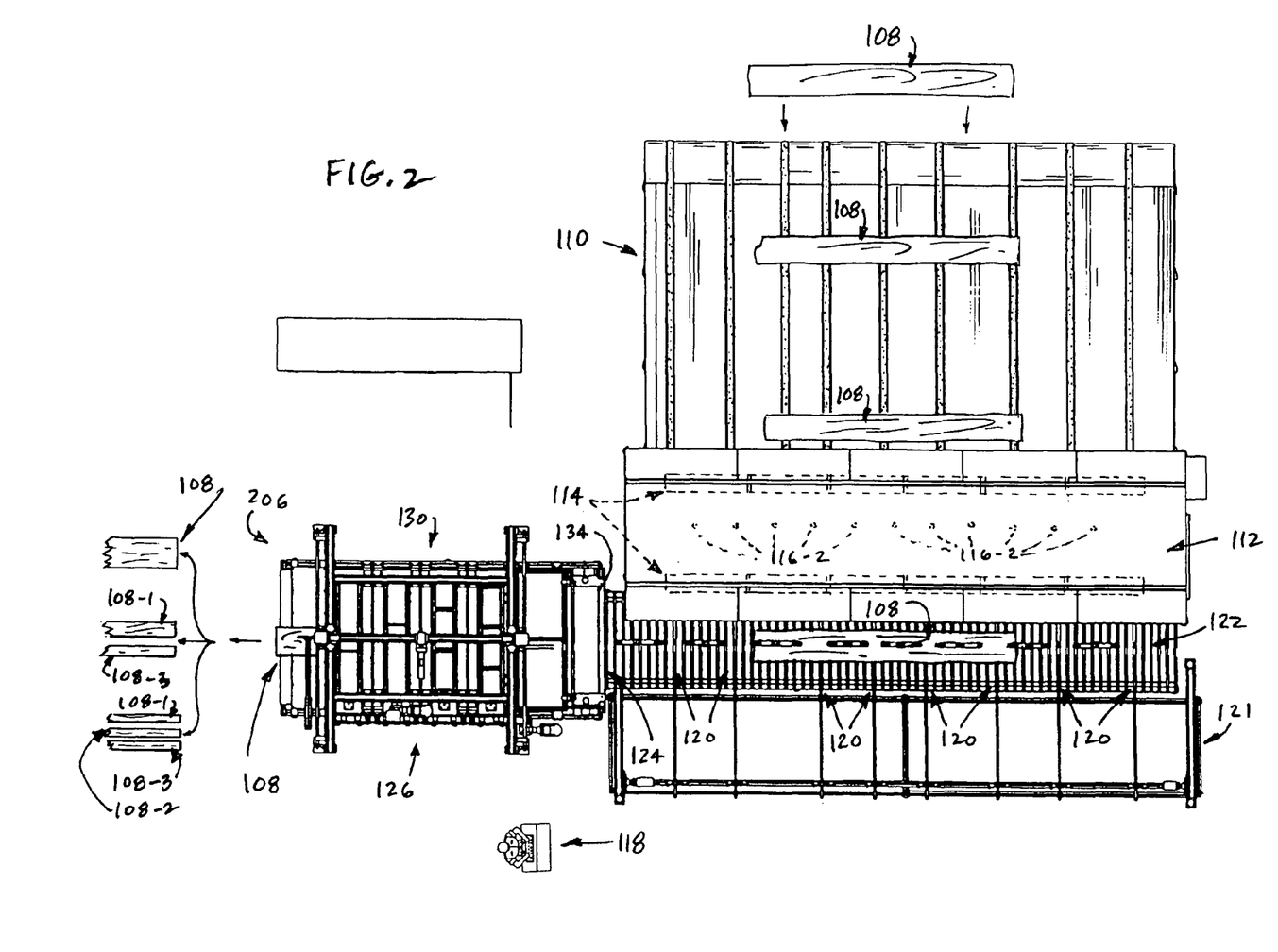
FIG. 2 illustrates a top plan view of the apparatus illustrated in FIG. 1.
Figure 3:
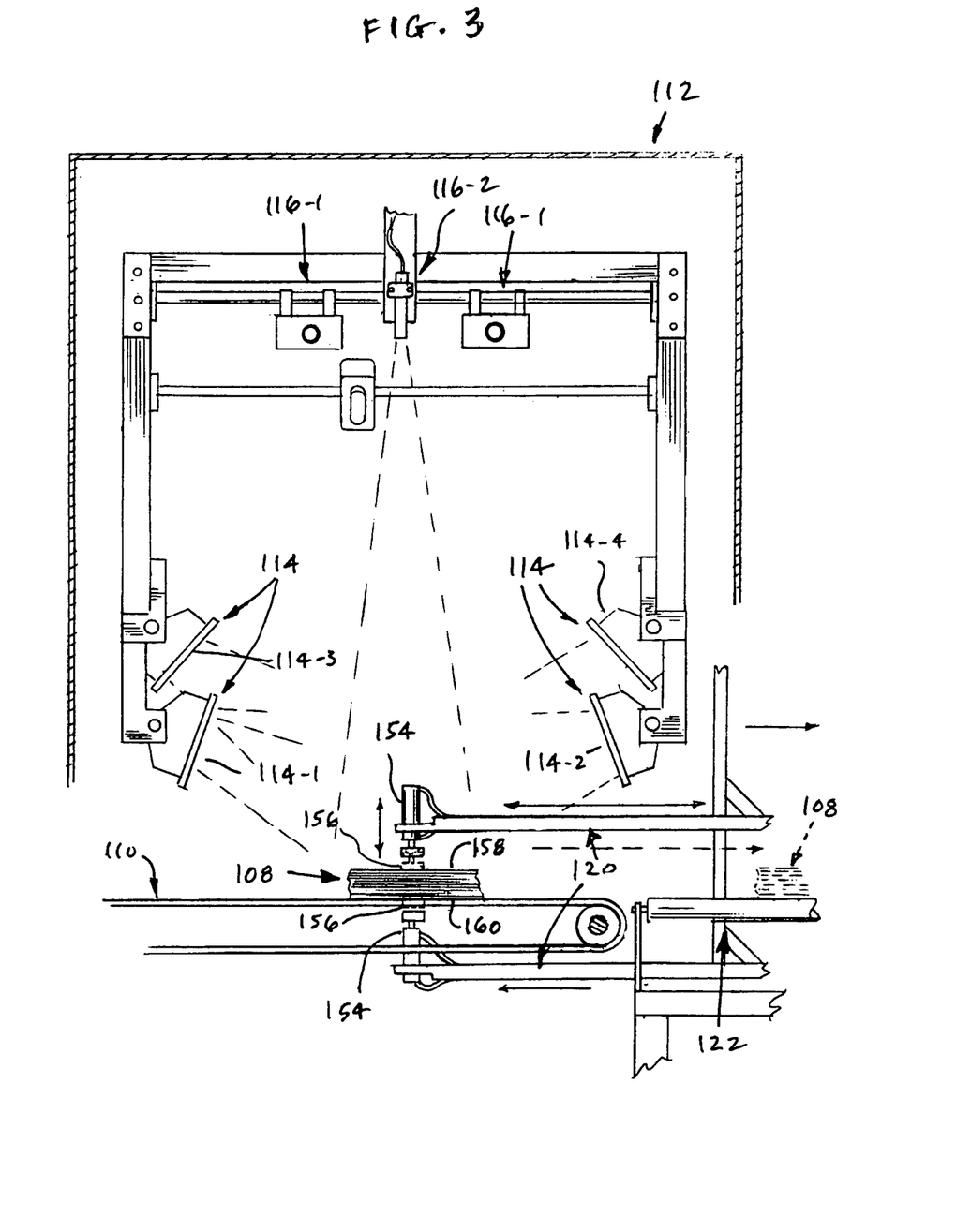
FIG. 3 illustrates an enlarged fragmentary sectional view of a detail of the apparatus illustrated in FIGS. 1-2, taken generally along section lines 3-3 of FIGS. 1-2.

Referring now to FIGS. 1-3, a book of veneer 108 is conveyed along a conveyor 110 through a scanner housing 112, where the book of veneer 108 is illuminated by lamps 114, which may include fluorescent and ultraviolet (blacklight) lamps, and scanned by imaging devices 116, such as cameras 116-1 and the like, for areas of contrast, such as heartwood, flaws, knots and the like, which it is desired to trim from the book 108. Imaging devices 116 may include one or more laser detectors 116-2 for detecting, for example, the leading and trailing edges of a book 108, and thus the width of the book 108, as the book 108 is conveyed through housing 112 on conveyor 110. Once the book 108 has been scanned by the imaging devices 116, and the width of the book 108 and locations of the areas of contrast provided via conductors (not shown) to a computer 118, the computer 118 calculates a trimming solution for the book 108 in an effort to optimize the value of veneer yielded by the book 108. The inside of housing 112 may be finished matte black to reduce internal reflections. Two cameras 116-1 are mounted at each end of housing 112. Lasers 116-2 are placed along the centerline of housing 112 above conveyor 110. Belts of conveyor 110 convey the book of veneer 108 across housing 112. In the illustrated system, the book of veneer 108 may optionally be manually marked, for example, with fluorescent chalk, by an operator before the book of veneer 108 enters housing 112. If such marking is detected on the book of veneer 108, computer 118 is programmed so that that marking overrides the optimization solution provided by computer 118.

A series of fetchers 120 are projected by motor(s) 121, such as (a) pneumatic or hydraulic piston-and-cylinder motor(s) or motor-driven ballscrew(s) or the like, mounted to a framework supporting the fetchers 120, toward the book 108, between the belts of conveyor 110, and into engagement with book 108. The fetchers 120 are then retracted, transferring the book 108 from conveyor 110 onto a conveyor 122 which conveys the book 108 transversely to its direction of motion through the scanner housing 112. Actuation of conveyor 122 moves book 108 to an inlet end 124 of a trimmer 126. Trimmer 126 includes an upper conveyor portion 130 and a lower conveyor portion 132. Upper conveyor portion 130 and lower conveyor portion 132 are vertically movable relative to one another for reasons which will be explained. The book 108 is transferred from conveyor 122 between inlet rollers 134, 136 of upper and lower conveyor portions 130, 132, respectively. Upper conveyor portion 130, including infeed roller 134 is adjusted vertically upward or downward as necessary to exert sufficient pressure on book 108 so that book 108 is driven by the rotation of the rollers of upper and lower conveyor portions 130, 132, respectively, through trimmer 126.

First, second, third and fourth circular saws 140, 142, 144, 146, respectively, are oriented between respective adjacent pairs of rollers of lower conveyor portion 132. First saw 140 is the most upstream, second saw 142 next, third saw 144 next, and fourth saw 146 is the most downstream in the motion of book 108 through trimmer 126. Saws 140, 142, 144 and 146 are independently mounted for traversal transversely of the direction of motion of book 108 through trimmer 126. Additionally, saws 140, 142, 144 and 146 are independently mounted to pivot about vertical axes so that they make angles with the longitudinal extent of the trimmer 126.

Turning now to certain details of scanner housing 112, and with reference to FIG. 3, scanner housing 112 houses multiple banks 114-1, 114-2, 114-3, 114-4 of lamps. The banks of lamps 114 extend lengthwise of housing 112 and transversely of the direction of motion of books of veneer 108 along conveyor 110. As the books of veneer 108 are transported on conveyor 110 through housing 112, they are illuminated by the banks of lamps 114, and images of the visible physical attributes of books of veneer 108 are scanned by scanners 116. The images are transmitted electrically to the computer 118. The electrical image signals may be digitized at the scanners 116 or by the computer 118 and/or its associated peripheral equipment. Once the book 108 has been scanned, the fetchers 120 are projected into close proximity to the book 108 by motor(s) 121. Motors 154, such as pneumatic or hydraulic piston-and-cylinder motors or motor-driven ballscrews or the like, mounted on the remote ends of fetchers 120 project gripper pads 156 between adjacent belts of conveyor 110 and into gripping contact with the top and bottom surfaces 158, 160 of book 108. Motor(s) 121 is (are) then actuated in the opposite direction to transfer the thus-gripped book 108 from conveyor 110 to conveyor 122. Motors 154 are then actuated to release the top and bottom surfaces 158, 160, and book 108 is conveyed along conveyor 122 to the inlet end 124 of trimmer 126.

Figure 4:
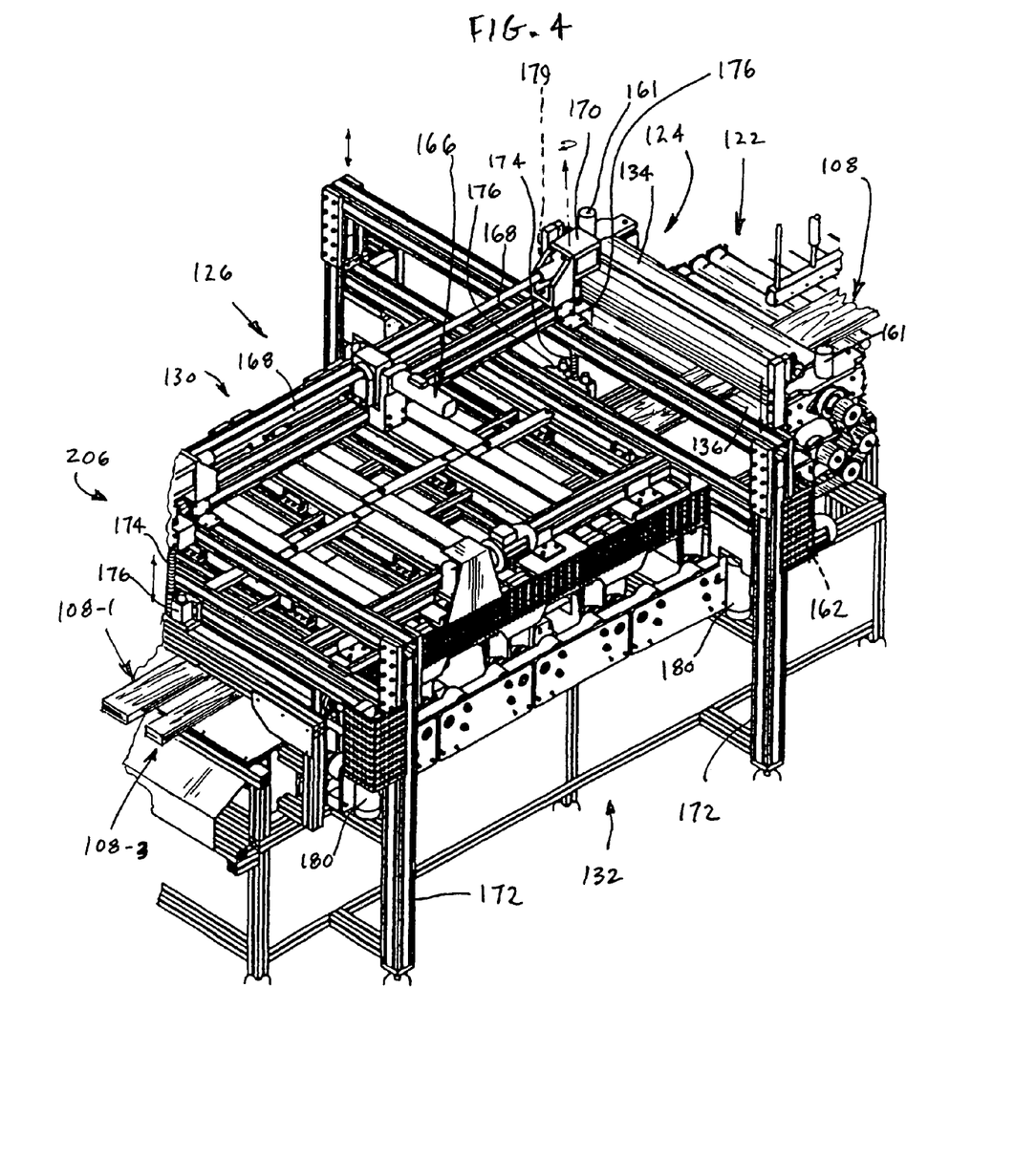
FIG. 4 illustrates an enlarged fragmentary perspective view of a detail of the apparatus illustrated in FIGS. 1-2.
Figure 5:
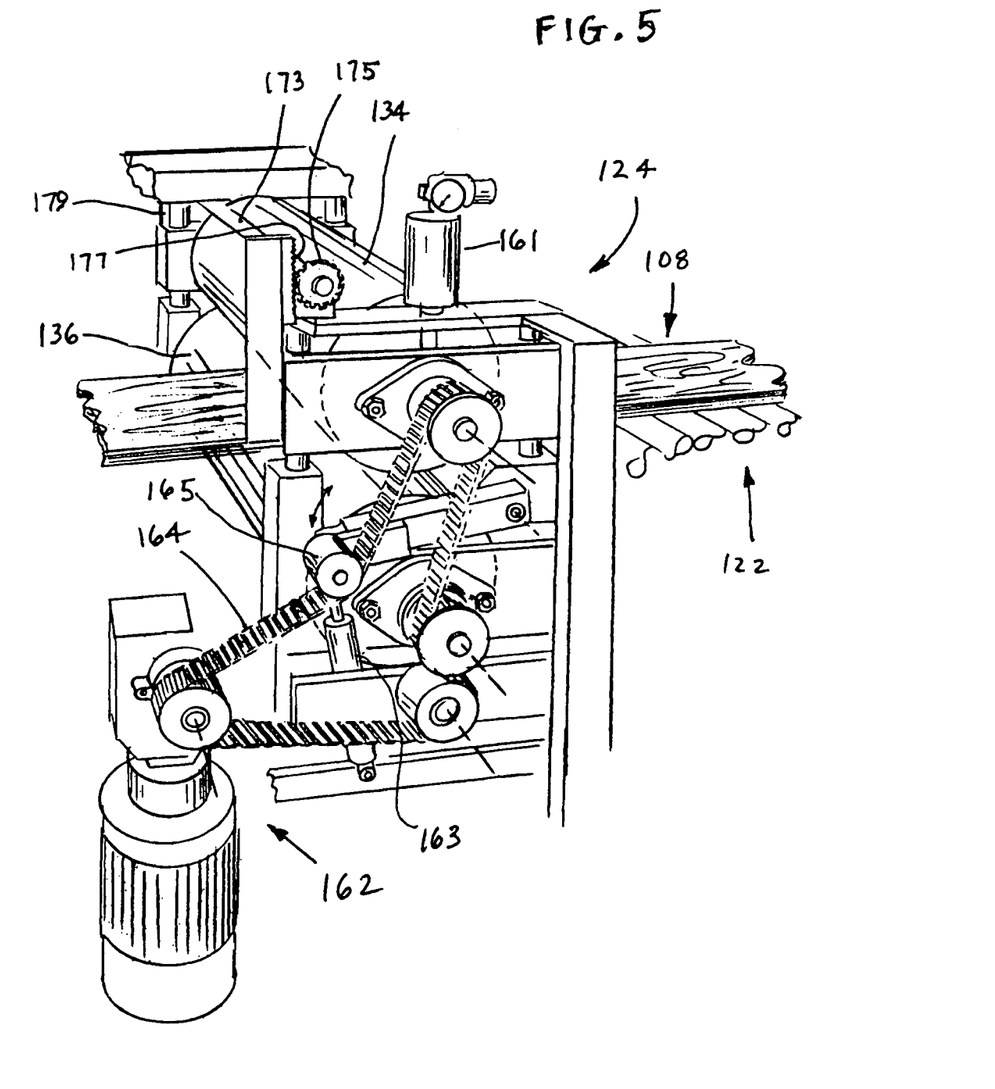
FIG. 5 illustrates an enlarged fragmentary perspective view of a detail of the apparatus illustrated in FIGS. 1, 2 and 4.
Figure 6:
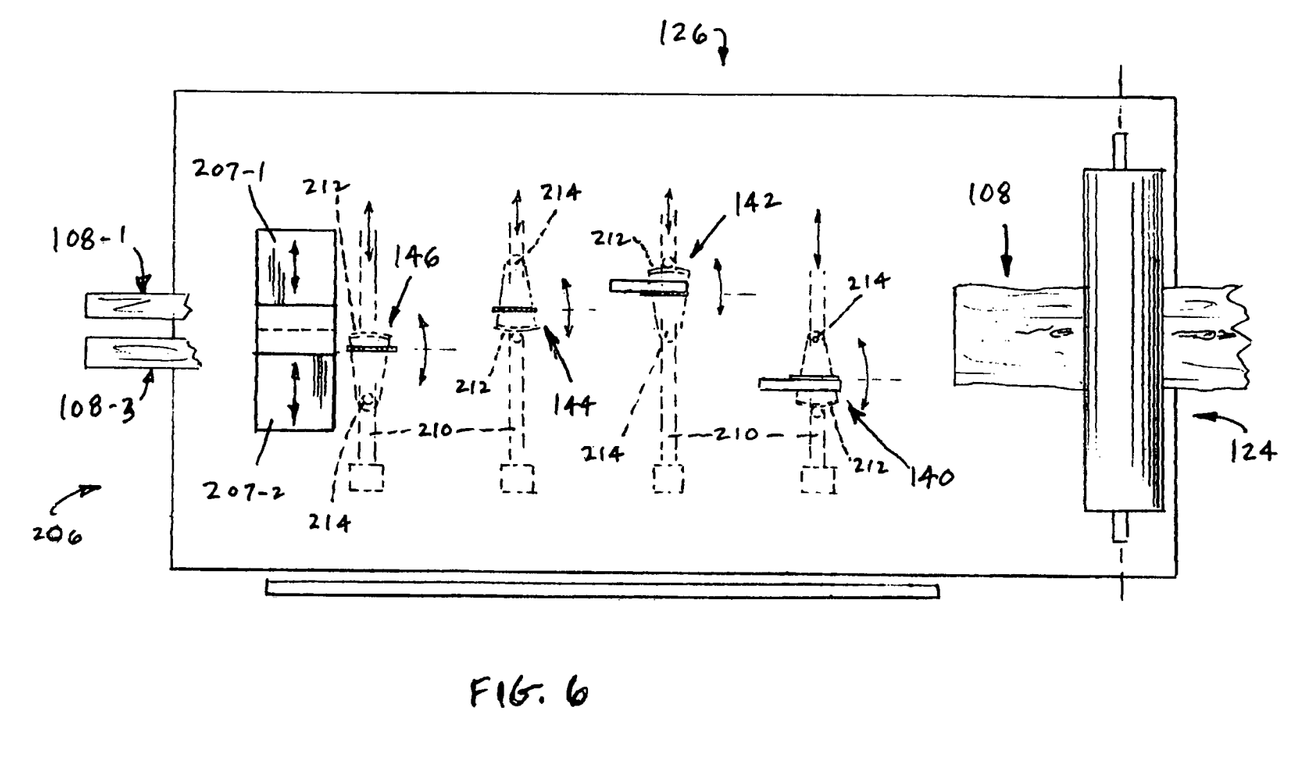
FIG. 6 illustrates a highly simplified diagrammatic top plan view of the detail illustrated in FIG. 5, illustrating certain aspects of its operation.

Referring now particularly to FIGS. 4-6, infeed rollers 134, 136 next engage the top and bottom surfaces 158, 160 of book 108 to transfer book 108 from conveyor 122 between the upper and lower conveyor portions 130, 132 of trimmer 126. Rollers 134, 136 are synchronously driven via a motor and transmission 162 and timing belt 164 so that the top and bottom surfaces 158, 160 are driven forward into trimmer 126 at the same speed. This helps to maintain the integrity of the book 108. The upper roller 134 is in a vertically movable frame driven downward by (a) motor(s) 161, for example, (a) piston and cylinder fluid motor(s). Another motor 163, for example, a piston and cylinder fluid motor, drives an idler 165 about which belt 164 is trained to take up the tension in belt 164 as upper roller 134 is raised and lowered.

Figure 7:
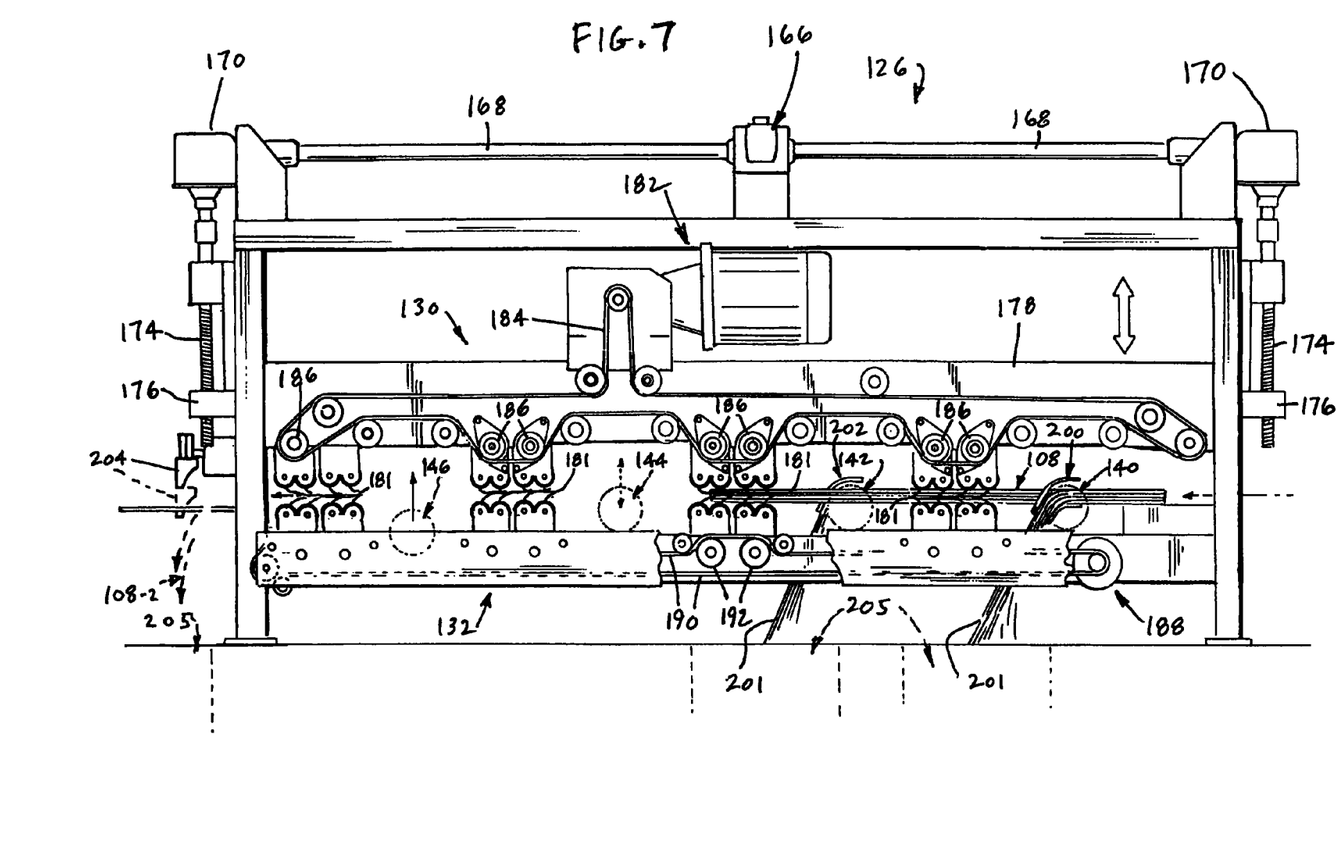
FIG. 7 illustrates a fragmentary side elevational view of certain details of the apparatus illustrated in FIGS. 1, 2, 4 and 6, taken generally along section lines 7-7 of FIGS. 1, 2, 4 and 6.

Referring now particularly to FIGS. 1, 4 and 7, the upper and lower conveyor portions 130, 132 are spaced from each other by a motor and transmission 166 which turns a cross shaft 168. Right angle gearboxes 170 are coupled to the remote ends of cross shaft 168. Lower conveyor portion 132, motor and transmission 166, shaft 168 and gearboxes 170 are mounted on a supporting frame 172. Ballscrews 174 at the outputs of gearboxes 170 engage followers 176 provided on the supporting frame 178 of upper conveyor portion 130. The motor and transmission 166 is assisted by motors 180, for example, pneumatic or hydraulic piston and cylinder motors, working between the four corners of supporting frame 172 and respective corners of supporting frame 178. Cross shafts 173 are also provided on upper conveyor portion 130 at the inlet 124 and outlet 206 ends of trimmer 126. Each cross shaft 173 has a pinion gear 175 mounted at each of its ends. The pinion gears 175 engage respective racks 177 on lower conveyor portion 130 to assist in maintaining upper and lower conveyor sections 130, 132 level. A linear variable differential transformer (LVDT) 179 at the inlet end 124 of trimmer 126 produces an output when the rollers 181 of upper conveyor portion 130 make contact and establish a desired pressure on the book of veneer 108. The feedback loop including the output of LVDT 179 and the positions of motor and transmission 166 and motors 180 establishes and maintains a suitable spacing between the rollers 181 supported in upper conveyor portion 130 and the rollers 181 supported in lower conveyor portion 132 to maintain the integrity of book 108 as book 108 is being conveyed through trimmer 126 and trimmed.

Referring particularly to FIG. 7, the individual rollers 181 of the upper and lower conveyor portions 130, 132 are driven by a motor and transmission 182 which drives a belt 184 trained about drive wheels 186 of the rollers 181 of upper conveyor portion 130 and a motor and transmission 188 which drives a belt 190 trained about drive wheels 192 of the rollers 181 of lower conveyor portion 132. The speeds of motor/transmission assemblies 182, 188 are synchronized by feedback loops including tachometers, position encoders or the like (not shown), fitted to the output shafts of the motor/transmission assemblies 182, 188, or the like, and motor controllers for controlling the motor/transmission assembly 182, 188 output rotation rates.

Turning now to FIGS. 4, 6 and 8-11, the most upstream saw 140 is generally oriented toward the right hand side of the trimmer 126 facing in the downstream direction in order to facilitate trimming of the right hand side of the book 108. The second most upstream saw 142 is generally oriented toward the left hand side of the trimmer 126 facing in the downstream direction in order to facilitate trimming of the left hand side of the book 108. The third most upstream saw 144 is generally oriented somewhat to the right of the center of a book of veneer 108 as the book 108 passes through the trimmer 126. The fourth most upstream saw 146 (the most downstream saw 146) is generally oriented somewhat to the left of the center of a book of veneer 108 as the book 108 passes through the trimmer 126.

Figure 8:
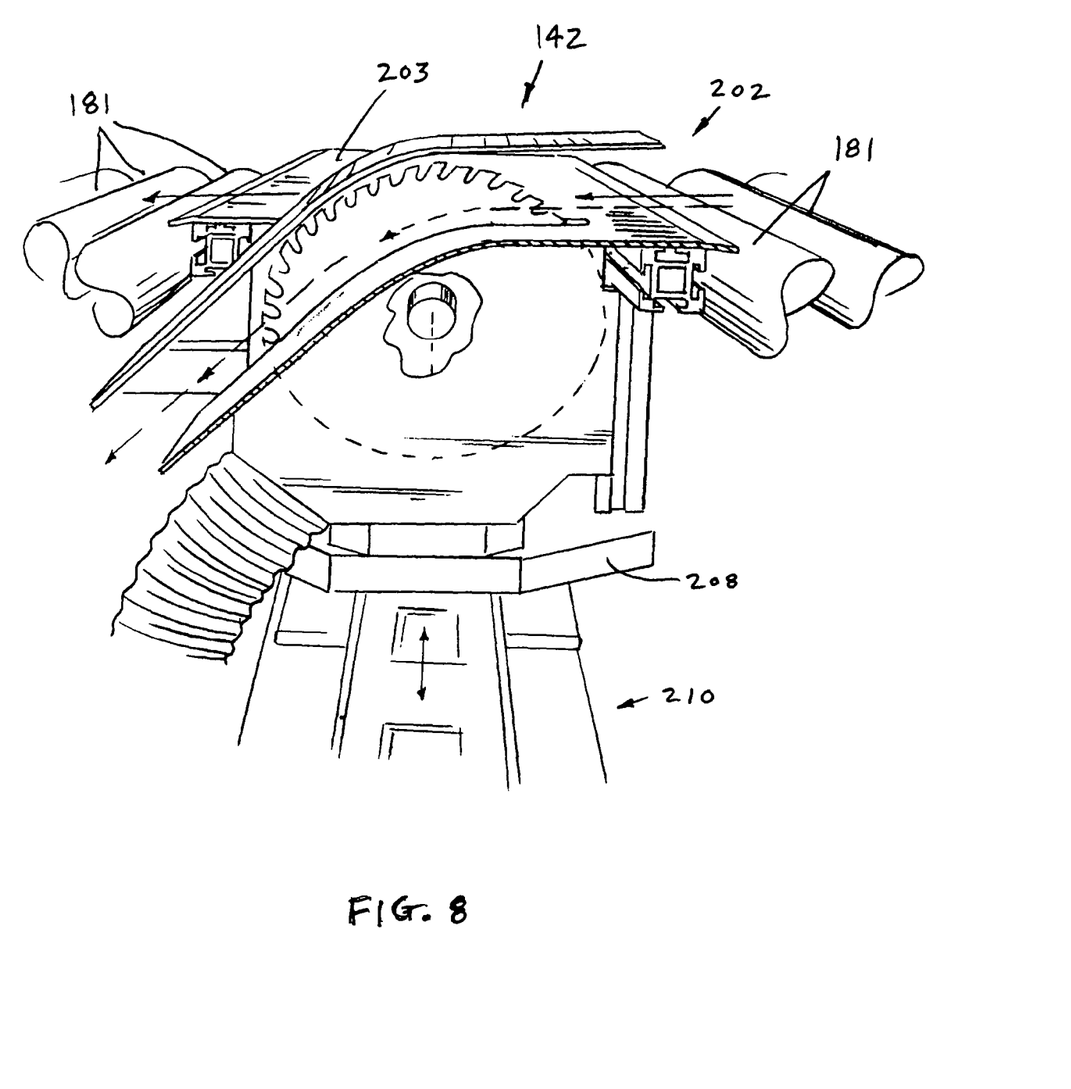
FIG. 8 illustrates a fragmentary, somewhat diagrammatic perspective view of certain details of the apparatus illustrated in FIGS. 1, 2, 4 and 6, taken generally along section lines 8-8 of FIG. 6.
Figure 9:
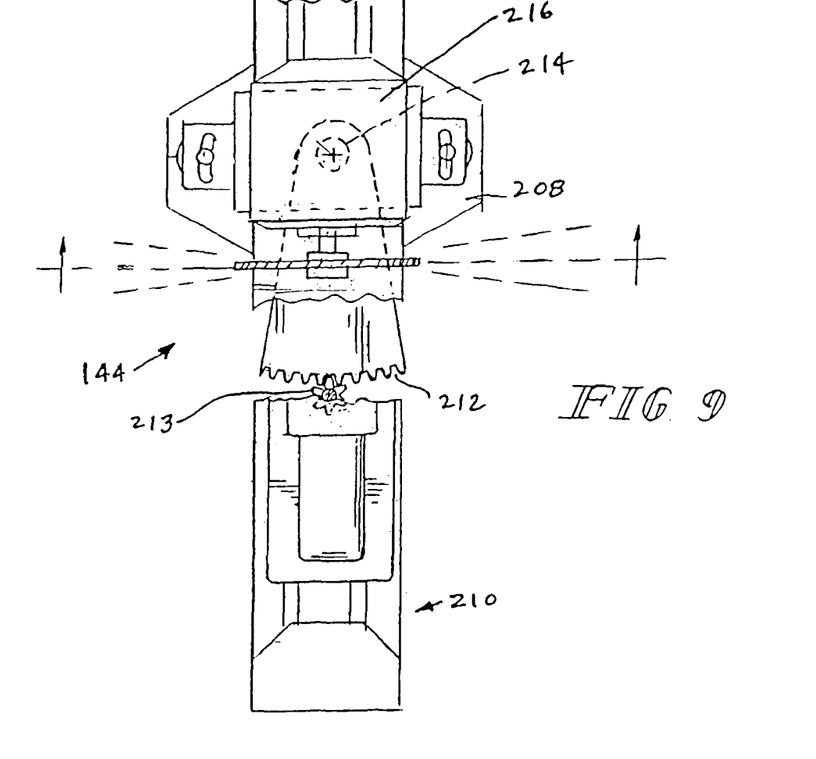
FIG. 9 illustrates a fragmentary, somewhat diagrammatic top plan view of certain details of the apparatus illustrated in FIGS. 1, 2, 4 and 6-8.
Figure 10:
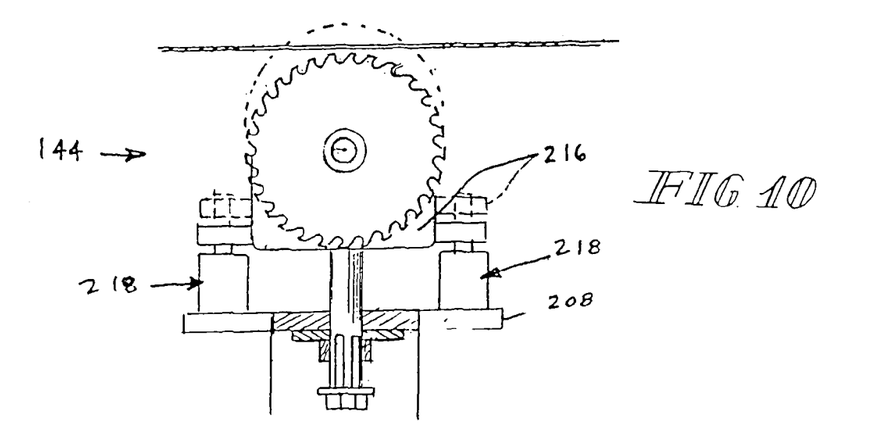
FIG. 10 illustrates a fragmentary, somewhat diagrammatic side elevational view of certain details of the apparatus illustrated in FIGS. 1, 2, 4 and 6-9.

Referring now particularly to FIGS. 7 and 8, waste gates 200, 202 are associated with saws 140 and 142. These gates 200, 202 in the illustrated embodiment are mounted on plates 203 of, for example, polished stainless steel. Plates 203 extend across the conveyor 132 a distance greater that the widest width of book 108 which will be trimmed, and the full lengths, upstream to downstream, of the bays within trimmer 126 in which saws 140 and 142 are located. Any trimmings 201 from the right and left hand edges of the book 108 are directed by the respective gates 200, 202 downward onto (a) waste conveyor(s) 205 which run(s) beneath trimmer 126, for conveyance to, for example, a boiler, incinerator, or the like.

Figure 11:
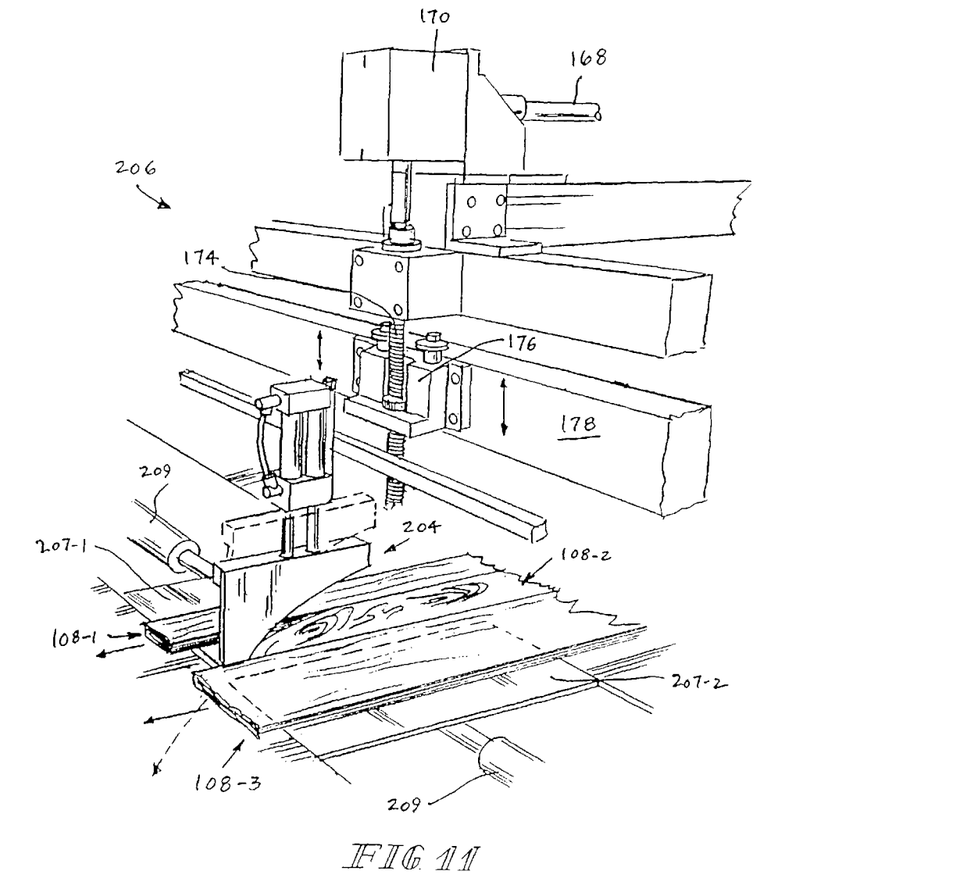
FIG. 11 illustrates an enlarged, somewhat diagrammatic perspective view of certain details of the apparatus illustrated in FIGS. 1, 2, 4, 6 and 7.

Referring now particularly to FIG. 11, a selectively movable waste gate 204 at the downstream end 206 of trimmer 126 handles waste removed from between the right and left margins of the book 108 by saws 144, 146 as dictated by the trimming solution. In some circumstances, the book 108 will be divided longitudinally into three narrower regions 108-1, 108-2 and 108-3, none of which will be diverted by waste gate 204. This occurs, for example, in the preparation of wood veneers where heartwood and sapwood are separated because of a difference in color, because they are more marketable when they are offered separately. In such events, the waste gate 204 will not be lowered into interfering relationship with the flow of the middle cut 108-2 of book 108 from the downstream end 206 of trimmer 126.

However, if saws 144, 146 are actuated to remove, for example, (a) knot(s), (a) flaw(s) or the like from the central region of book 108, and the removed central section 108-2 is to be diverted to waste, waste gate 204 is actuated downward into interfering relationship with the flow of the thus excised central region 108-2 from the downstream end 206 of trimmer 126 and support plates 207-1, 207-2 are separated by (an) appropriate motor(s) 209, and the central region 108-2 is deflected by the waste gate 204 downward through the opening between support plates 207-1, 207-2 onto a waste conveyor 205.

Referring now particularly to FIGS. 6 and 8-10, the saws 140, 142, 144, 146 are mounted to traverse across the direction of motion of book 108 through trimmer 126. In this manner, trimmer 126 can accommodate books of different widths, and can divide these widths as determined by the trimming solution. For example, each saw 140, 142, 144, 146 support mechanism 208 and plates 203 can be mounted on a lateral traversing mechanism 210, for example, one of the general type available from Nadella GmbH, Tränkestrasse 7, 70597 Stuttgart, Germany. The saw 140, 142, 144, 146 support mechanism 208 is pivotally mounted from the lateral traversing mechanism 210 to permit the saw 140, 142, 144, 146 to be angled at a slight angle α, for example, in the range $0° \leq \alpha \leq 3°$ in either direction in accordance with the trimming solution to aid in optimizing the amount of merchantable veneer which book 108 will yield. Angling of the saws 140, 142, 144, 146 is achieved by providing an arcuate rack 212 on each support mechanism 208 and pivotally 214 coupling each support mechanism 208 to its respective traversing mechanism 210. A motor driven pinion 213 engages each rack 212 to drive the respective rack 212 to effect the trimming solution. The respective saw's motor 216 is mounted by one or more motors 218, for example, piston and cylinder fluid motors, on the respective support mechanism 208. Motors 218 project their respective saw 140, 142, 144, 146 upward to cut, and downward to clear, the books 108, all according to the trimming solution.

What is claimed is:

1. Apparatus for trimming the side edges of sheets, the apparatus including a first saw, a second saw, a conveyor having a longitudinal extent, the side edges of the sheets extending generally in the direction of the longitudinal extent of the conveyor, the conveyor for conveying the sheets past the first saw for trimming a first side edge of the sheets, then past the second saw for trimming a second side edge of the sheets, a first motor for adjusting the first saw to cut a first side edge of the sheets at a non-zero angle to the longitudinal extent of the conveyor and a second motor for adjusting the second saw to cut a second side edge of the sheets at a non-zero angle to the longitudinal extent of the conveyor.

2. The apparatus of claim 1 further including a third saw, the second saw arranged along the conveyor upstream in the direction of conveyance of the conveyor from the third saw, the conveyor conveying the sheets past the third saw for splitting the sheets between the first and second side edges.

3. The apparatus of claim 2 further including a fourth saw, the third saw arranged along the conveyor upstream in the direction of conveyance of the conveyor from the fourth saw, the conveyor conveying the sheets past the fourth saw for removing a portion of the sheets between the first and second side edges.

4. The apparatus of claim 3 further including a control system for automatically positioning the at least one of the first, second, third and fourth saws.

5. The apparatus of claim 3 wherein at least one of the first, second, third and fourth saws includes an additional motor for adjusting the position of the at least one of the first, second, third and fourth saws generally transversely of the conveyor.

6. The apparatus of claim 5 further including a control system for automatically adjusting the position of the at least one of the first, second, third and fourth saws generally transversely of the conveyor.

7. The apparatus of claim 3 wherein the first, second, third and fourth saws comprise circular saws.

8. The apparatus of claim 1 wherein the conveyor comprises a conveyor for conveying stacked sheets.

9. The apparatus of claim 8 wherein the conveyor comprises a conveyor for holding the sheets together in stacks.

10. The apparatus of claim 9 wherein the sheets comprise sheets of wood veneer.

11. The apparatus of claim 1 further comprising a guide and a waste conveyor for guiding and conveying waste from the saws.

* * * * *